Sept. 13, 1960    J. U. TORRES    2,952,482
COUPLING WITH AUTOMATICALLY ACTUATED CAM SLEEVE
Filed Feb. 4, 1957    2 Sheets-Sheet 2

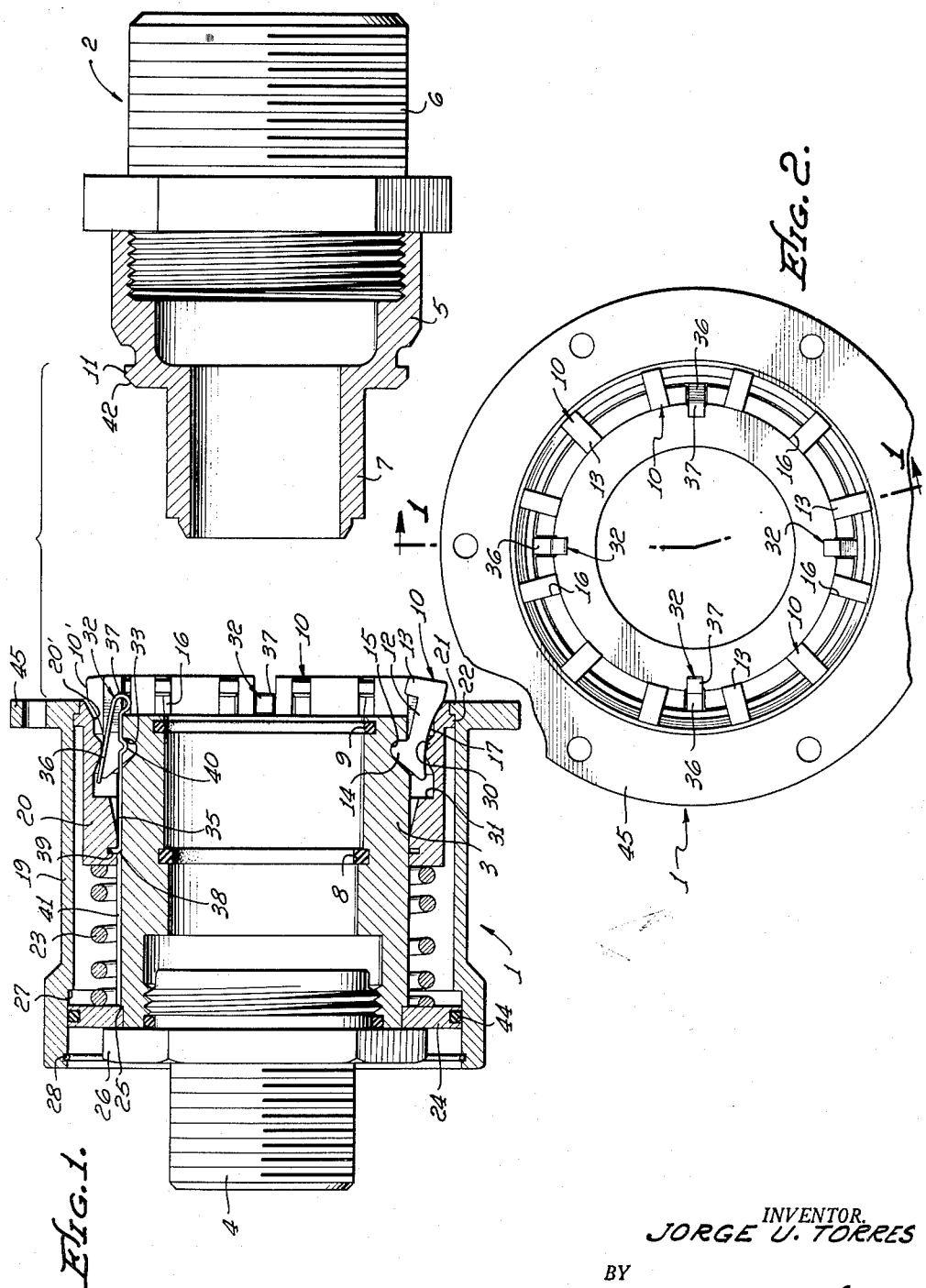
Sept. 13, 1960     J. U. TORRES     2,952,482
COUPLING WITH AUTOMATICALLY ACTUATED CAM SLEEVE
Filed Feb. 4, 1957     2 Sheets-Sheet 1
INVENTOR.
JORGE U. TORRES
BY
Paul A. Weilein
ATTORNEY.

INVENTOR.
JORGE U. TORRES
BY
Paul A. Weilein
ATTORNEY.

United States Patent Office 2,952,482
Patented Sept. 13, 1960

2,952,482
COUPLING WITH AUTOMATICALLY ACTUATED CAM SLEEVE

Jorge U. Torres, Los Angeles, Calif., assignor to E. B. Wiggins Oil Tool Company, Inc., Los Angeles, Calif., a corporation of California Filed Feb. 4, 1957, Ser. No. 638,068

22 Claims. (Cl. 285—313)

This invention relates to an improved conduit coupling in which a pair of mutually engageable coupling members may be quickly locked in coupled relation by a single pushing action and as quickly released by a simple movement of a part of one of the coupling members.

It is an object of this invention to provide a coupling such as described having an improved spring-loaded locking means for releasably locking the coupling members together, the locking means being of simple construction and arrangement compared to locking means heretofore employed and characterized by the desired durability and reliability of performance.

It is another object of the invention to provide in a coupling such as described a novel latch means which operates to latch the spring loaded locking means in unlocked position incident to the locking means being moved into that position, and to release the locking means for movement into locking position incident to movement of said coupling members into engagement with one another.

It is another object of this invention to provide a coupling such as described wherein locking dogs for releasably locking the coupling members together, spring latch fingers for releasably latching the dogs in unlocked position and actuating means for the dogs and latch fingers are constructed and arranged in such a manner on one of the coupling members, that the coupling as a whole constitutes an improvement in this art as to simplicity of construction and operation, reduction in the number of parts usually required, compactness and durability, and reliability of performance.

It is another object hereof to provide a coupling such as described in which the actuating means for the locking dogs and the latch fingers includes an actuating ring of novel construction and arrangement, spring loaded by a single spring and of simplified and durable construction assuring reliable operation of the locking dogs and the latch fingers.

It is another object hereof to provide in a coupling member such as described, on one of the two coupling members thereof, novel spring latch fingers which are constructed and arranged so that responsive to the spring action thereof and relative axial movement between the fingers and the body of said one coupling member, the spring loaded actuating ring will be latched in a position maintaining the dogs in unlocked position, the fingers being moved so as to release the actuating ring for movement to urge the dogs into locking position, when the two coupling members are engaged one with the other. These movements and the construction and arrangement of the spring fingers, the actuating ring and the locking dogs are such that the number of parts thereof and associated therewith are reduced and the strength, durability and reliability thereof are increased.

It is another object hereof to provide a new form of locking dog and mounting means therefor wherein the dogs and the mounting provisions therefor are simplified as to construction and arrangement, make it unnecessary to follow close tolerances in constructing the coupling members and improve the dogs and the mounting means therefor as to strength, durability and performance.

It is another object of this invention to provide a conduit coupling wherein one of a pair of the coupling members embodies a novel arrangement of a tubular body, locking dogs pivoted on the body, a spring loaded actuating ring operable on the body to hold the dogs in place as well as to move the dogs into and from locking position responsive to relative axial movement between the body and the ring, spring latch fingers connected with the ring for axial movement therewith and for resilient radial movement relative thereto into and out of latching engagement with the body to releasably latch the ring in position holding the dogs in unlocked position, and an actuating or gripping sleeve surrounding the body and the ring and operatively connected therewith so that limited relative axial movement may take place between the sleeve and the ring as well as between the sleeve and ring as a unit and the body and dogs as a unit.

The limited axial movement permitted between the sleeve and the ring makes it possible to hold the sleeve and forcibly move the coupling members into coupled relation without transmitting from the sleeve to the ring a force that might derange or damage parts of the coupling or cause premature movement of the dogs into locking position and thus prevent the coupling of the coupling members.

The relative axial movement permitted between the sleeve and ring as a unit and the body and dogs as another unit, make it possible to effect relative movement between the dogs and the ring for moving the dogs into unlocked position, and at the same time cause the spring latch fingers to releasably latch the ring and dogs in unlocking position.

Upon bringing the coupling members into engagement with one another, the spring latch fingers are engaged by the end of the coupling member opposite thereto and moved radially out of latching contact with the tubular body of the coupling member carrying the fingers. This releases the ring and body so that relative axial movement of the ring and body will take place with a snap action under the spring load thereon whereby cam portions on the ring and dogs will cooperate to move the dogs into position to releasably lock the two coupling members together.

The coupling members may be uncoupled by forcibly effecting relative axial movement between the ring and the body of the coupling member carrying these parts. This relative movement produces a cam action such that the dogs will swing out of locking position. At the same time, the spring latch fingers move into latching engagement with the tubular body to releasably hold the body and ring against relative movement from the position maintaining the dogs in unlocked position.

This invention possesses many other advantages and has other objects which may be made more easily apparent from a consideration of the embodiments of the invention shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view partly in elevation of a coupling embodying the present invention, showing the two coupling members separated from one another, the view of the coupling member at the left being taken on the line 1—1 of Fig. 2;

Fig. 2 is an end elevation of the coupling member shown at the left of Fig. 1;

Figure 3:
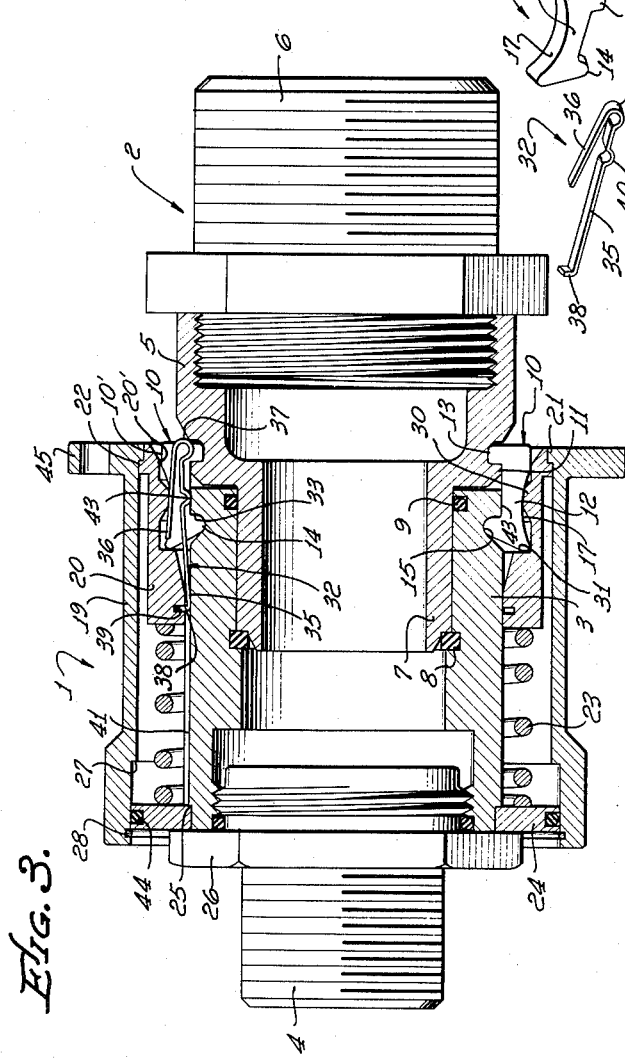
Fig. 3 is a longitudinal sectional view partly in elevation showing the coupling members locked in coupled relation.

A conduit coupling made in accordance with this invention comprises a socket type coupling member 1 and a nipple type coupling member 2 adapted to be connected with conduits or the like, not shown, and to be releasably locked in coupled relation as shown in Fig. 3.

The socket coupling member 1 includes a tubular body 3 having a fitting 4 threadedly connected at one end thereof to provide for connection of the coupling members with a conduit.

The nipple coupling member 2 includes a tubular body 5 having a fitting 6 threadedly connected at one end thereof to provide for connecting this coupling member with a conduit. The other end of the body 5 has a reduced extension 7 adapted to be positioned in the bore of the body 3 of the socket coupling member 1. Suitable sealing rings 8 and 9 in body 3 of the coupling member 1 are engageable by the reduced extension 7 to provide a fluid tight seal between the coupling members.

It should be noted that the space afforded in the bores of the tubular bodies 3 and 5 of the coupling members 1 and 2 may be used to accommodate valves, not shown, and which, in a manner well known in this art, will open incident to the coupling of the coupling members and close responsive to separation of the coupling members.

Locking means are provided to releasably lock the coupling members 1 and 2 in coupled relation and generally includes a plurality of locking dogs 10 pivotally mounted on the body 3 of the coupling member 1 for movement into and out of engagement with an annular locking flange 11 on the body 5 of the coupling member 2. Each dog has an elongated body 12 provided at one end with a right angularly extended locking lug 13 adapted to hook over the flange 11 in locking the coupling members together. A rounded fulcrum projection or lug 14 is provided at the other end of the body 12 for engagement in a groove 15 extending circumferentially of the exterior of the body 3 of the coupling member 1. The body 12 is also provided with a concave cam surface 17 extending longitudinally thereof.

Figure 5:
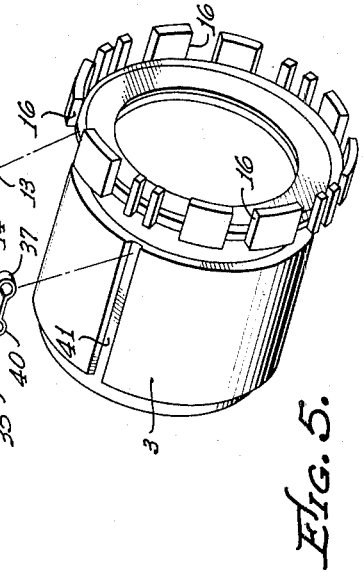
Fig. 5 is an exploded perspective view of parts of one of the coupling members.

It should be noted that the dogs 10 are arranged in a circular series on the outer end of the body 3 and that means are provided on the body to maintain the dogs in predetermined circumferentially spaced relation to one another. This means (see Figs. 2 and 5) may comprise, as here shown, a series of slots 16 and on the outer end of the body, the dogs being freely movable in these slots in being swung into and from locking position.

Actuating means for the dogs 10 is provided on the body 3 of the coupling member and includes an actuating or gripping sleeve 19 and an actuating ring 20 surrounding the body. The ring 20 is disposed between the sleeve and the body in overlying engagement with the dogs 10 to hold the latter in the groove 15. The ring 20 is held in place by the sleeve 19, there being annular flanges 21 and 22 on the sleeve and ring respectively, urged into engagement one with the other by a spring 23. This spring is confined on the body 3 between the actuating ring 20 and a stop ring 24. The stop ring 24 is confined on the rear end of the body 3 between a shoulder 25 on the body and a flange 26 on the fitting 4. This stop ring also serves as a stop to limit relative axial movement between the sleeve 19 and the body 3, the sleeve being provided with a shoulder 27 and a snap ring 28 engageable with opposite sides of the ring 24.

As a means for effecting pivotal movement of the dogs 10 into and from locking position, the actuating sleeve 20 is provided interiorly with an annular cam projection or rib 30 engageable with the concave cam surfaces 17 on the dogs. The cam projection 30 and cam surfaces 17 cooperate so that upon relative axial movement between the dogs 10 and the ring 20 in one direction, the dogs will be swung into locking position. Relative axial movement of the body and ring in the opposite direction will swing the dogs out of locking position. When the dogs 10 are in locking position as shown in Fig. 3, the forward end portion 20' of the ring 20 engages the forward end portions 10' of the dogs to hold the dogs in locking position. Also the dogs are held against movement out of locking position by a shoulder 31 on the ring 20 abutting the rear ends of the dogs.

Latching means including spring latch fingers 32 may be provided on the body 3 of the coupling member 1 to releasably hold the actuating ring 20 and body 3 in the positions shown in Fig. 1, whereby the dogs will be held in unlocked position.

The latch fingers 32 are connected with the ring 20 and disposed between the ring and the body 3 for releasable latching engagement with an annular shoulder 33 formed by the annular groove 15 in the body 3, the latching and releasing action depending upon radial movement of the fingers as well as relative axial movement between the fingers and the body. Each latch finger 32 is formed of a spring steel strip bent back upon itself to form a latch portion or leg 35, a spring portion or leg 36 and a rounded head portion 37 at the juncture of the portions 35 and 36. The free end of the latch portion 35 is bent right angularly as at 38 and engaged in a suitable recess, preferably in the form of an annular groove 39 in the ring 20, thereby securing the latch finger to this ring. Between its ends the latch portion 35 is bent to form a latch projection 40 adapted to be moved into and from locking engagement with the shoulder 33 on the body 3. The spring portion or leg 36 engages the annular cam rib 30 interiorly of the ring 20 and holds the latch portion 35 under tension in a longitudinal groove 41 formed in the body 3, the groove retaining the latch finger in place while relative axial sliding movement takes place between the finger and the body 3.

As here shown, four of the spring latch fingers 32 are arranged 90 degrees apart on the body 3, each finger being disposed in a groove 41 between a pair of the locking dogs 10. When the fingers are in latching position as shown in Fig. 1, rounded heads 37 thereof project forwardly from the adjacent end of the body 3. Actually, however, any desired number of latch springs 32 and/or dogs 10 may be utilized.

It should be noted that when the coupling members 1 and 2 are uncoupled as shown in Fig. 1, the spring 23 urges the actuating ring 20 forwardly so that the flange 22 on the ring abuts the flange 21 on the sleeve 19 and holds the latter against rearward movement relative to the ring. The latch projections 40 on the spring latch fingers 32 engage the shoulder 33 on the body 3 and thus hold the body 3 against rearward movement under the force of the spring 23, thereby holding the ring 20 in position to maintain the dogs 10 in unlocked position. At this time the stop ring 24 is positioned in spaced relation to the snap ring 28 and the stop shoulder 27 so that the limited relative axial movement may be effected between the sleeve 19 and the body 3.

Figure 4:
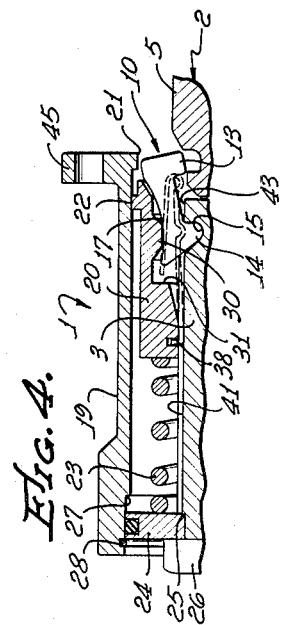
Fig. 4 is a fragmentary longitudinal sectional view showing the locking means and the latching means in the intermediate position assumed when initially engaging the coupling members preliminary to the movement of the locking means into locking position.

Upon now moving the coupling members together for locking them in coupled relation, the reduced extension 7 of the body 5 of the coupling member 2 enters the bore of the body 3 of the coupling member 1 so that a bevelled portion 42 on the coupling member 2 will engage the rounded heads 37 of the latch fingers 32 and move the latch fingers 32 radially outward thereby disengaging the latch projections 40 from the shoulders 33 as shown in Fig. 4. In forcing the coupling members together incident to movement of the latch fingers 32 out of latching position, the spring 23 exerts a force against the actuating ring 20 and stop ring 24 and a quick relative axial movement takes place between the body 3 and ring 20 whereby the cam rib 30 in cooperation with cam surfaces 17 on the dogs 10, will swing the dogs with a snap action into locking engagement with the flange 11 on the coupling member 2. The end 20' of the ring 20 holds the dogs in locking position. Co-incident with this locking action, the heads 37 of the latch fingers 32 come to rest upon the surface 43 of the body 3 forwardly of the shoulders 33, as shown in Fig. 3 thereby maintaining the latch fingers out of latching position.

It should be noted that in moving the coupling members together while holding the outer sleeve 19, no force is exerted from this sleeve against the ring 20 inasmuch as the sleeve 19 is permitted limited axial forward movement relative to the ring 20 and body 3, due to the spacing of the stop ring 24 between the stop shoulder 27 and stop ring 28. This prevents derangement or damage of the spring, latch fingers and associated elements or such relative movement of the body 3 and actuating ring 20 as might cause premature movement of the locking dogs into locking position. In this connection it should be noted that the stop ring 24 may be provided with an O-ring 44 engaging the sleeve 19 and operating as a frictional holding means to prevent rattling and unintentional relative axial movement between the sleeve 19 and ring 20.

The coupling members may be uncoupled by pulling rearwardly on the sleeve 19, that is, in a direction tending to compress spring 23, and thereby moving the ring 20 rearwardly so that the dogs 10 are swung out of engagement with the flange 11 on the coupling member 2. At the same time that the ring 20 is moved rearwardly the spring latch fingers 32 are correspondingly moved so that the latch projections 40 will snap into the groove 15 and against the shoulder 33 thereby latching the dogs 10 in unlocked position. It will be noted that the sleeve 19 may be provided at its forward end with a mounting flange 45 so that if this sleeve is fixed to a support, separation of the coupling members may be effected by pulling on the coupling member 2. This will cause the body 3 of the coupling member 1 to be moved forwardly together with the dogs 10 relative to the actuating ring 20 and sleeve 19 thereby rocking the dogs out of locking position and at the same time latching them in such position.

It is important to note that the particular form of the dogs here shown is advantageous in that no rings or extraneous elements are necessary to pivotally support them on the body 3, it only being necessary to provide the circumferentially extending groove 15 on the body 3 and the simple fulcrum projections 14 on the dogs to effect the desired pivotal mounting of the dogs.

It is also important to note that the actuating ring 20 as here provided serves not only as an actuator for the dogs 10 but as a means for maintaining the dogs in place, as well as a means for actuating the latch fingers.

The particular form of the dogs and the actuating ring, as here provided, and the manner in which they are relatively arranged, make it possible to hold the coupling to desired small diameter limits without sacrificing flow capacity, strength or necessitating more than desired axial dimensions in the coupling members.

I claim:

1. A conduit coupling comprising: a pair of mutually engageable coupling members; one of said members having a body; locking means movably mounted on said body; an actuating ring on said body; a latch member joined to said ring; said body and locking means as a unit and said ring and latch member as another unit being relatively axially movable; cam elements on said ring and said locking means cooperable to move said locking means into and from a position for locking said coupling members together responsive to relative axial movement of said units; latch elements on said body and said latch member respectively, cooperable to releasably latch said units against relative axial movement responsive to relative axial movement of said units; resilient means biasing said units for relative axial movement in the direction for moving said locking means into said locking position; and means on said other coupling member for engaging and moving said latch member to release said units for relative axial movement.

2. A conduit coupling comprising: a pair of mutually engageable coupling members; one of said members having a body; locking means movably mounted on said body; an actuating ring on said body; latch members joined to said ring; said latch members being biased to move radially against said body; said body and locking means as a unit and said ring and latch members as another unit being relatively movable axially thereof; elements on said ring and said body cooperable to move said locking means into and from a position for locking said coupling members together responsive to relative axial movement of said units; latch elements on said body and said latch members cooperable to releasably latch said units against relative axial movement responsive to the relative axial movement of said units which effects movement of said locking means out of said locking position; resilient means biasing said units for relative axial movement in the direction for moving said locking means into said locking position; and means on said other coupling member for engaging and moving said latch members radially of said body to release said units for relative axial movement in said direction when said coupling members are brought into engagement with one another.

3. A conduit coupling comprising: a pair of mutually engageable tubular coupling members; one of said members having a body and a plurality of locking members pivoted on the body; an actuating ring on said body member; a plurality of resilient latch members connected with said ring and biased to move toward said body; said body and locking members as a unit and said ring and latch members as a second unit being connected for relative axial movement; cam elements on said locking members and said ring cooperable responsive to said relative axial movement to move said locking members into and from locking engagement with the other coupling member; said body having a circumferential groove exteriorly thereof providing a shoulder; said locking members having fulcrum portions seated in said groove; said resilient latch members being disposed between said ring and said body and having latch portions engageable with said shoulder responsive to the relative axial movement between said units which moves said locking members into unlocked position; spring means biasing said body and ring for the relative axial movement which effects movement of said locking members into said locking position; and means on said other coupling member engageable with said latch members for moving said latch members radially out of latching position.

4. In a conduit coupling: a pair of mutually engageable tubular coupling members; one of said members having a body; an actuating ring surrounding said body; locking dogs fulcrumed on said body for movement into and from locking engagement with the other coupling member; said ring surrounding said dogs and holding them on said body; spring latch members joined to said ring, extending axially thereof and biased to move toward said body; said ring and said body being relatively axially movable; cam elements on said ring and locking dogs cooperable to move said dogs into and from locking engagement with said other coupling member responsive to relative axial movement between said ring and said body; spring means biasing said body and ring to move axially relatively in the direction for moving said locking members into said locking engagement; latch elements on said latch members and said body cooperable responsive to the relative movement between the ring and the body which moves the dogs out of locking position, to releasably latch said ring and body in position maintaining said dogs in unlocked position; and means on said other coupling member operable to move said latch members into positon releasing said body and ring for relative axial movement.

5. A conduit coupling comprising a pair of mutually engageable coupling members; one of said members having a body; said body having a circumferential groove; said body having a plurality of axially extending slots exteriorly thereof; a plurality of locking dogs mounted in said slots; each of said dogs having a fulcrum portion seated in said groove, a hook portion for locking engagement with the other coupling member, and a cam surface; an actuating ring mounted on said body in overlying engagement with said dogs; a spring engaged with said ring and said body biasing said body and ring for relative axial movement in opposite directions; resilient latch members joined to said ring; said latch members being extended axially of said ring and biased toward said body; latch elements on said latch members and said body cooperable to releasably latch said ring and body against said relative axial movement; means on said other coupling member for engaging and moving said latch members to release said ring and body for relative axial movement; and a cam element on said ring engageable with said cam surface on said dogs for moving said dogs into and from locking position responsive to relative axial movement between said ring and said body.

6. A conduit coupling comprising: a pair of mutually engageable coupling members; one of said members having a body; said body having a circumferential groove externally thereof; said body having a plurality of axially extending slots exteriorly thereof; a plurality of locking dogs mounted in said slots; each of said dogs having a fulcrum portion seated in said groove, a hook portion for locking engagement with the other coupling member, and a cam surface; an actuating ring mounted on said body in overlying engagement with said dogs; a spring engaged with said ring and said body biasing said body and ring for relative axial movement in opposite directions; resilient latch members joined to said ring; said latch members being biased toward said body; latch elements on said latch members and said body cooperable to releasably latch said ring and body against said relative axial movement; means on said other coupling member for engaging and moving said latch members to release said ring and body for relative axial movement; a cam element on said ring engageable with said cam surface on said dogs for moving said dogs into and from locking position responsive to relative axial movement between said ring and said body; a sleeve surrounding said body and said ring; and means on said sleeve and said ring cooperable for restraining relative axial movement between said sleeve and said ring in one direction; said last named means permitting relative axial movement between said ring and sleeve in the opposite direction.

7. In a conduit coupling: a pair of mutually engageable tubular coupling members; one of said members having a body; an actuating ring surrounding said body; locking dogs fulcrumed on said body for movement into and from locking engagement with the other coupling member; said ring holding said dogs on said body; latch members secured to said ring; said latch members extending axially of said ring between said ring and said body; said body being axially movable relative to said ring and said latch members; cam elements on said ring and said dogs cooperable to move said dogs into and from locking engagement with said other coupling member responsive to said relative axial movement; said body having a latch shoulder thereon; each of said latch members having a latch element thereon engageable with said shoulder to releasably latch said ring and body against relative axial movement; spring means engaged with said ring and body biasing said ring and body to move axially in opposite directions; said latch elements being movable into and from a position for engaging said shoulder responsive to relative axial movement between said body and said ring; and a beveled portion on said other coupling member operable to move said latching members out of latching position upon moving said coupling members into contact one with the other.

8. A conduit coupling comprising: a pair of mutually engageable coupling members; one of said members having a tubular body; locking means movably mounted on said body; an actuating ring on said body; resilient latch members joined to said ring; said latch members being biased to move toward said body; a sleeve surrounding said body; stop elements on said sleeve and said body mutually engageable for limiting relative axial movement between said sleeve and said body; stop elements on said sleeve and said ring cooperable to restrain relative movement between said sleeve and said ring in one direction; said ring and latch members as a unit and said body and locking means as another unit being relatively axially movable; cam elements on said ring and said locking means cooperable to move said locking means into and from a locking engagement with the other coupling member responsive to relative axial movement between said units; latch elements on said latch members and said body cooperable to releasably latch said units against said relative axial movement responsive to relative axial movement of said units; resilient means biasing said units for relative axial movement in the direction for moving said locking means into locking position; and means on said other coupling for engaging and moving said latch members to release said units for relative axial movement in said direction.

9. A conduit coupling comprising: a tubular socket coupling member; a tubular nipple coupling member adapted to be extended into said socket coupling member; a locking element on said nipple coupling member; locking dogs mounted on said socket coupling member to move into and from locking engagement with said locking element; an actuating ring on said socket coupling member; said ring and socket coupling member being relatively movable axially thereof; means on said ring and said dogs cooperable to effect said movement of said dogs responsive to said relative axial movement; a plurality of elongated resilient latch members each secured at one end to said ring and engaging said socket coupling member; said latch members extending axially of said ring and having portions movable radially between said socket coupling member and said ring; a spring engaged with and urging said ring and socket coupling member to move axially relative to one another; a latch shoulder on said socket coupling member cooperable with said radially movable portions of said latch members to releasably latch said ring and socket coupling member against relative axial movement responsive to the relative axial movement of said ring and socket coupling member; and an element on said nipple coupling member engageable with ends of said latch members to move said latch members out of said latching position.

10. A conduit coupling comprising: a socket having a tubular body; a tubular nipple having a portion engageable with said body; a locking element on said nipple; locking members mounted on said body to move into and out of locking engagement with said element to releasably hold said socket and nipple in coupled relation; an actuating ring surrounding said body; said ring and body being relatively axially movable; cam elements on said ring and locking members cooperable to move said locking members into and from said locking position responsive to relative axial movement between said body and said ring; resilient latch fingers connected with said ring; said fingers being interposed between said ring and said body and biased toward said body; said fingers having portions extending outwardly between pairs of said locking members; latch elements on said fingers and said body cooperable for latching said ring in a position maintaining said locking members out of locking position incident to relative axial movement between said body and said ring; means engaged with and biasing said body and ring to move axially in opposite directions; and means on said nipple operable to engage said outwardly extending portions of said fingers to move said fingers out of said latching position incident to moving said nipple into engagement with said body.

11. A conduit coupling comprising: a socket having a tubular body; a tubular nipple having a portion engageable with said body; a locking element on said nipple; locking members mounted on said body to swing into and out of locking engagement with said element to releasably hold said socket and nipple in coupled relation; an actuating ring surrounding said body; said ring and body being relatively axially movable; cam elements on said ring and locking members cooperable to swing said locking members into and from said locking position responsive to relative axial movement between said body and said ring; resilient latch fingers connected with said ring for movement therewith; said fingers being interposed between said ring and said body and biased toward said body; said fingers having portions extending outwardly between pairs of said locking members; said body having a circumferential groove forming a shoulder thereon; said locking members being fulcrumed in said groove; said fingers having latch portions engageable with said shoulder to releasably hold said ring in a position maintaining said locking members in unlocked position responsive to relative axial movement between said ring and said body; spring means urging said ring and body to move axially in opposite directions and operable to move said ring in the direction for moving said locking members into locking position responsive to movement of said latch portion from engagement with said shoulder; and means on said nipple engageable with said outwardly extending portions of said fingers to move said fingers out of latching position upon moving said nipple and socket into engagement with one another.

12. A conduit coupling comprising: a socket having a tubular body; a tubular nipple having a portion engageable with said body; a locking element on said nipple; locking members mounted on said body to move into and out of locking engagement with said element to releasably hold said socket and nipple in coupled relation; an actuating ring surrounding said body; said ring and body being relatively axially movable; cam elements on said ring and locking members cooperable to move said locking members into and from said locking position responsive to relative axial movement between said body and said ring; resilient latch fingers connected with said ring; said fingers being interposed between said ring and said body and biased toward said body; said fingers having portions extending outwardly between pairs of said locking members; latch elements on said fingers and said body cooperable for latching said ring in a position maintaining said locking members out of locking position incident to relative axial movement between said body and said ring; spring means engaged with and biasing said body and ring to move axially in opposite directions; a sleeve surrounding said body and said ring; means on said sleeve and said body cooperable to provide for limited relative axial movement between said sleeve and said body; means on said sleeve and said ring cooperable upon axial movement of said sleeve in one direction, to move said ring in the direction to move the locking members out of the locking position; and means on said nipple for engaging said outwardly extending portions of said fingers and moving said fingers out of latching position upon bringing said nipple and socket together.

13. A conduit coupling comprising: a socket having a tubular body; a tubular nipple having a portion extensible into said body; a locking element on said nipple; locking members fulcrumed on said body to swing into and out of locking engagement with said locking element; an actuating ring on said body; said ring and body being relatively axially movable; cam elements on said ring and locking members cooperable to swing said locking members into and from said locking position responsive to relative axial movement between said body and said ring; resilient latch fingers carried by said ring between said ring and said body and biased to yieldably engage said body; said fingers having end portions extending outwardly from an end of said body; said body having a groove defining a shoulder; said latch fingers having portions movable into said groove against said shoulder responsive to relative axial movement of said ring and body in one direction; spring means operable to move said ring for moving said locking members into locking position responsive to movement of said latch fingers out of latching position; a sleeve surrounding said body and said ring; a stop ring fixed on said body between said sleeve and said body; axially spaced stop elements on said sleeve engageable with said ring to limit relative axial movement between said sleeve and said body; other stop elements on said sleeve and said ring engageable to provide for axial movement of said ring with said sleeve in the direction for moving said locking elements out of locking position; and a latch releasing element on said nipple for engaging and moving said fingers out of latching position upon bringing said nipple and socket together for the coupling thereof.

14. A coupling of the type described comprising: a pair of axially engageable coupling members; one of said members having an annular shoulder thereon; a plurality of dogs having locking portions engageable with said shoulder; means pivotally mounting said dogs on the other of said coupling members for movement of said locking portions into and out of engagement with said shoulder; said mounting means including a fulcrum element on each dog; said other coupling member having a groove extending circumferentially thereof; said fulcrum elements being freely seated in said groove; operating means engaging said dogs and axially movable for swinging said dogs on the fulcrum elements; said operating means including a pair of tubular members surrounding said other coupling member and disposed one within the other; the inner of said tubular members and said dogs having cooperative camming means for swinging said dogs in coupling-locking and unlocking directions; said outer tubular member being movable axially for a limited distance relative to said inner tubular member in the forward direction; abutment means on both said outer and inner tubular members blocking the movement of the outer tubular member relative to said inner tubular member in the rearward direction; and spring latch means carried by said inner tubular member and operable to releasably retain the latter in coupling unlocking position.

15. A coupling of the type described comprising: a pair of axially engageable coupling members; one of said members having an annular shoulder thereon; a plurality of dogs having locking portions engageable with said shoulder; means pivotally mounting said dogs on the other of said coupling members for movement of said locking portions into and out of engagement with said shoulder; said mounting means including a fulcrum element on each dog; said other coupling member having a seat for each fulcrum element with said fulcrum elements freely disposed in said seats; operating means engaging said dogs axially movable on said other coupling member for swinging said dogs on the fulcrum elements; said operating means including a pair of tubular members axially movable on said other coupling member and mounted one within the other; one of said tubular members and said dogs having cooperative camming means for swinging said dogs in coupling-locking and unlocking directions; said outer tubular member being movable axially for a limited distance relative to said inner tubular member in the forward direction; abutment means on both said outer and inner tubular members blocking the movement of the outer tubular member relative to said inner tubular member in the rearward direction; releasable spring latch means cooperatively engaged with said one tubular member and with said other coupling member for retaining said operating means in a position with said dogs in a non-locking position.

16. In a coupling of the type described comprising, a pair of axially engageable coupling members, means releasably locking said coupling members together, means for operating said releasable locking means, said locking means comprising a dog pivotally mounted on one coupling member, said operating means including an element movable relative to said dog, said element and dog having cooperative camming surfaces for rocking the dog on its pivotal mounting into and out of locking engagement with one of the coupling members: that improvement wherein said dog has a fulcrum projection thereon; the coupling member on which said dog is mounted having a recess in which said fulcrum projection is freely disposed; said operating means having a spring latch carried thereby for axial movements therewith; said spring latch having a latching element projecting therefrom and engageable in said dog-mounting recess to retain said operating means in a position camming said dog out of locking position.

17. In a coupling of the type described comprising, a pair of axially engageable coupling members, means releasably locking said coupling members together, means for operating said releasable locking means, said locking means comprising a dog pivotally mounted in one coupling member, said operating means including an element movable relative to said dog, said element and dog having cooperative camming surfaces for rocking the dog on its pivotal mounting into and out of locking engagement with one of the coupling members: that improvement wherein said operating means includes an elongated resilient latch member having an integral latch element projecting laterally therefrom between the ends thereof; the coupling member on which said dog is pivotally mounted having a recess for receiving said latch element when the operating means is in a position camming said dog out of locking position, thereby to latch said operating means in such a position; said latch member having one end disposed for engagement with the other coupling member to cam said latch element out of said recess to release the operating means for axial movement in a coupling locking direction; and resilient means for biasing said operating means in said coupling locking direction.

18. A coupling of the type described comprising: a pair of axially engageable coupling members; one of said members having a locking shoulder thereon; a locking dog pivotally mounted on the other coupling member and having a locking portion engageable with said shoulder to releasably retain said coupling members connected together; operating means for said dog including a camming element axially movable on said other coupling member; said camming element and said dog having cooperative camming surfaces for pivoting said dog into and out of locking engagement with said shoulder; resilient means biasing said camming element in a dog locking direction; an actuating sleeve slidably mounted on and surrounding said other coupling members; and cooperative abutment flanges on said actuating sleeve and on said camming element for shifting said camming element in a dog unlocking direction along with said actuating sleeve and allowing relative axial movement of said actuating sleeve and said camming element in the other direction.

19. In a separable coupling including a pair of coupling members; a dog pivotally mounted on one member and having means adapted to be interlocked with the other member to hold the members together; and operating means for pivoting said dog into and out of such holding position; that improvement wherein said operating means includes a camming member shiftable relative to said dog for effecting such pivoting of the dog; means biasing said camming member in the forward direction; and a shiftable operating member shiftable relative to said camming member and said one coupling member having means interengageable with said camming member for shifting said camming member in the rearward direction, said shiftable operating member being mounted on and surrounding said one coupling member and said camming member.

20. A coupling as defined in claim 19, wherein said operating member and said camming member comprise a pair of coaxially arranged sleeves, and the camming member-biasing means includes an axially extended spring disposed within said operating sleeve and engaged with said camming sleeve.

21. A coupling of the type described comprising: a pair of axially engageable coupling members; one of said members having a locking shoulder thereon; a locking dog pivotally mounted on the other coupling member and having a locking portion engageable with said shoulder to releasably retain said coupling members connected together; operating means for said dog including a camming element axially movable on said other coupling member; said camming element and said dog having cooperative camming surfaces for pivoting said dog into and out of locking engagement with said shoulder; resilient means biasing said camming element in a dog locking direction; an actuating sleeve slidably mounted on said other coupling member; cooperative abutment means on said actuating sleeve and on said camming element for shifting said camming element in a dog unlocking direction along with said actuating sleeve and allowing relative axial movement of said actuating sleeve and said camming element in the other direction; said other coupling member having a groove thereon; said dog having a portion seated in said groove as a fulcrum for the dog; and a spring latch carried by said camming element for movement into said groove to releasably hold said camming element in position maintaining the dog in unlocked poistion.

22. A coupling of the type described comprising: a pair of axially engageable coupling members; a plurality of locking dogs on one of said coupling members; said dogs having locking portions engageable with the other coupling member for releasably locking said coupling members together; said one coupling member having a groove exteriorly thereof; said dogs having fulcrum portions freely seated in said groove; a ring surrounding and engaging said dogs; said ring and dogs being relatively axially movable; said ring and said dogs having cooperative camming means for swinging said dogs on said fulcrum portions into and from locking engagement with said other coupling member responsive to said relative axial movement; means on said one coupling member disposed between said dogs to maintain the dogs circumferentially spaced from one another; latch means arranged between said ring and said dogs so as to extend into said groove and releasably latch said ring and dogs against relative axial movement responsive to the relative axial movement between said ring and dogs which swings said dogs out of locking position; and means on said other coupling member operable upon moving said coupling members together, for engaging said latch means and moving said latch means out of said groove.

(References on following page)

References Cited in the file of this patent

UNITED STATES PATENTS

| | | |
|---|---|---|
| Re. 23,120 | Earle et al. | June 14, 1949 |
| 751,345 | Saunders | Feb. 2, 1904 |
| 1,841,318 | Earnest | Jan. 12, 1932 |
| 1,916,284 | Ragan | July 4, 1933 |
| 2,238,706 | Ohls | Apr. 15, 1941 |
| 2,425,500 | Wiggins | Aug. 12, 1947 |
| 2,461,699 | Scheiwer | Feb. 15, 1949 |
| 2,473,973 | Scheiwer | June 21, 1949 |
| 2,552,543 | Earle et al. | May 15, 1951 |
| 2,568,516 | Scheiwer | Sept. 18, 1951 |
| 2,699,961 | Omon et al. | Jan. 18, 1955 |
| 2,789,838 | Palm | Apr. 23, 1957 |
| 2,888,278 | Torres et al. | May 26, 1959 |

FOREIGN PATENTS

| | | |
|---|---|---|
| 847,163 | France | June 26, 1939 |
| 985,539 | France | Mar. 14, 1951 |